United States Patent [19]
Weiant, Jr. et al.

[11] Patent Number: 6,044,350
[45] Date of Patent: Mar. 28, 2000

[54] CERTIFICATE METER WITH SELECTABLE INDEMNIFICATION PROVISIONS

[75] Inventors: Monroe A. Weiant, Jr., Trumbull; Frederick W. Ryan, Jr., Oxford, both of Conn.

[73] Assignee: Pitney Bowes Inc., Stamford, Conn.

[21] Appl. No.: 09/220,829

[22] Filed: Dec. 24, 1998

[51] Int. Cl.[7] .................................................. G06F 17/60
[52] U.S. Cl. ............................ 705/1; 713/166; 713/170; 713/176; 713/181; 713/152; 713/175; 713/178; 713/158; 705/76
[58] Field of Search .................................. 705/1, 64, 76; 380/277; 713/166, 170, 176, 181, 152, 175, 178, 158

[56] References Cited

U.S. PATENT DOCUMENTS

| | | | |
|---|---|---|---|
| 4,900,904 | 2/1990 | Wright et al. ............................ 235/381 |
| 5,214,702 | 5/1993 | Fischer ..................................... 380/30 |
| 5,416,841 | 5/1995 | Merrick .................................... 380/29 |
| 5,418,854 | 5/1995 | Kaufman et al. ........................ 380/23 |
| 5,422,953 | 6/1995 | Fischer ..................................... 380/23 |
| 5,448,641 | 9/1995 | Pintsov . |
| 5,796,841 | 8/1998 | Cordery et al. . |
| 5,949,877 | 9/1999 | Traw et al. ................................ 380/4 |

*Primary Examiner*—James P. Trammell
*Assistant Examiner*—Chinor M. Lee
*Attorney, Agent, or Firm*—Steven J. Shapiro; Michael E. Melton

[57] ABSTRACT

A system includes an accounting register; structure for creating and attaching a digital signature to a message; a memory having stored therein a plurality of different indemnification provisions and a plurality of different service rates each associated with a corresponding one of the plurality of different indemnification provisions; apparatus for selecting and associating a specific one of the plurality of different indemnification provisions to the digital signature; and a device for adjusting the accounting register, wherein at times when the specific one of the plurality of different indemnification provisions has been selected and associated with the digital signature the adjusting device accounts for a one of the plurality of different service rates that corresponds to the specific one of the plurality of different indemnification provisions.

16 Claims, 3 Drawing Sheets

| | KEY | LENGTH | SECURITY LEVEL (YEARS) | INDEN. AMOUNT | SERVICE RATE | PROCESSING TIME |
|---|---|---|---|---|---|---|
| 256 | A | 512 | 2 | $ 100 | $ 0.10 | 0.5 SEC |
| | A | 512 | 2 | $ 1,000 | $ 1.00 | 0.5 SEC |
| | B | 1024 | 5 | $ 100 | $ 0.25 | 4.0 SEC |
| | B | 1024 | 5 | $ 1,000 | $ 2.50 | 4.0 SEC |
| | C | 4096 | 15 | $ 100 | $ 0.75 | 4.5 MIN |
| | C | 4096 | 15 | $ 1,000 | $ 7.50 | 4.5 MIN |

CERTIFICATE METER WITH SELECTABLE INDEMNIFICATION PROVISIONS

FIELD OF THE INVENTION

The instant invention relates to certificate meters which certify users of electronic commerce and, more particularly, to a certificate meter for electronic commerce that provides a user the capability of selecting one of a plurality of different indemnification provisions to be associated with the issuance of a digitally signed message.

BACKGROUND OF THE INVENTION

U.S. Pat. No. 5,796,841, issued to Cordery, et al. on Aug. 18, 1998, (hereinafter referred to as the '841 patent) discloses a certificate meter. The certificate meter of the '841 patent is used in electronic commerce to account for a service charge associated with each use of the certificate meter and to ensure that upon receipt of a message the recipient can verify that (1) the message is genuine and signed by the sender (authentication) and (2) the message has not been altered (integrity). However, the period for which the certificate issued by the certificate meter is valid, from a security viewpoint, is dependent upon advances made in cryptoanalysis and computing power. That is, it should be assumed that the private key used to digitally sign the message will likely, at sometime in the future, be capable of being compromised. Accordingly, the period of time for which a signed message is considered to be valid is at least partially dependent upon the length of the private key used to sign the message. The larger the private key that is used, the more time consuming and complex are the computations required to compromise the private key.

In view of the above, one way to make the signed message more secure is to use to a private key that is extremely large. Thus, the private key can be made large enough so that any foreseeable advances in computing power will still make determination of the private key impractical. Unfortunately, as the size of the key increases the amount of processing time required to generate and verify a digitally signed message also significantly increases. The potentially large increase in processing time is not acceptable because it decreases the overall efficiency of the certificate meter system.

In addition to the above, not all messages require the same level of security. Some messages need to be protected for a significantly longer period of time and have a large value associated with them (e.g. a home mortgage contract). Other messages need to be protected for only a few years and have comparatively little value associated with them (e.g. a college ID). Still other messages occur on a frequent basis and therefore the time required to process them must be kept to a minimum (e.g. credit card transaction). As mentioned above, the additional processing overhead required to provide security for a long period of time is burdensome and unwarranted for messages that have only a short life and must be processed quickly. Thus, what is needed is a certificate meter that provides the user with a capability to selectively apply one of a plurality of digital signatures of varying levels of security to a specific message. The selected digital signature will have a validity period that is commensurate with the type of message being processed.

Furthermore, the certificate meter of the '841 patent provides an efficient mechanism for paying a certificate authority for its services but does not address the question of the monetary indemnification that the certificate authority is willing to provide to a user who suffers a loss based on placing trust in the security that was to be provided by using the signed message. The issue of indemnification is critical to all of the parties involved in the messaging transaction. That is, the receiver of the message wants assurance that he will be indemnified if he acts based on trust in the signed message and still suffers a monetary loss. Furthermore, assuming that the receiver has a notion of what loss he might potentially incur, then he specifically would desire an indemnification that covers such loss. On the other hand, the sender of the signed message wants the receiver to take an action based on the message contents and therefore would like to provide to the receiver proof that an appropriate level of indemnification is guaranteed by the digitally signed message. Finally, the certificate authority wants to receive a payment from the sender that varies according to the level of indemnification to be provided. Thus, what is needed is a certificate meter which permits the user the ability to select a specific level of indemnification for each digitally signed message he sends.

SUMMARY OF THE INVENTION

It is an object of the invention to provide a system that provides the user the capability to select one of a plurality of different indemnification provisions for a particular signed message issued by a certificate meter. This object is met by providing a system that includes an accounting register; structure for creating and attaching a digital signature to a message; a memory device having stored therein a plurality of different indemnification provisions and a plurality of different service rates each associated with a corresponding one of the plurality of different indemnification provisions; apparatus for selecting and associating a specific one of the plurality of different indemnification provisions to the digital signature; and a device for adjusting the accounting register, wherein at times when the specific one of the plurality of different indemnification provisions has been selected and associated with the digital signature the adjusting device accounts for a one of the plurality of different service rates that corresponds to the specific one of the plurality of different indemnification provisions.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figures 1, 3:
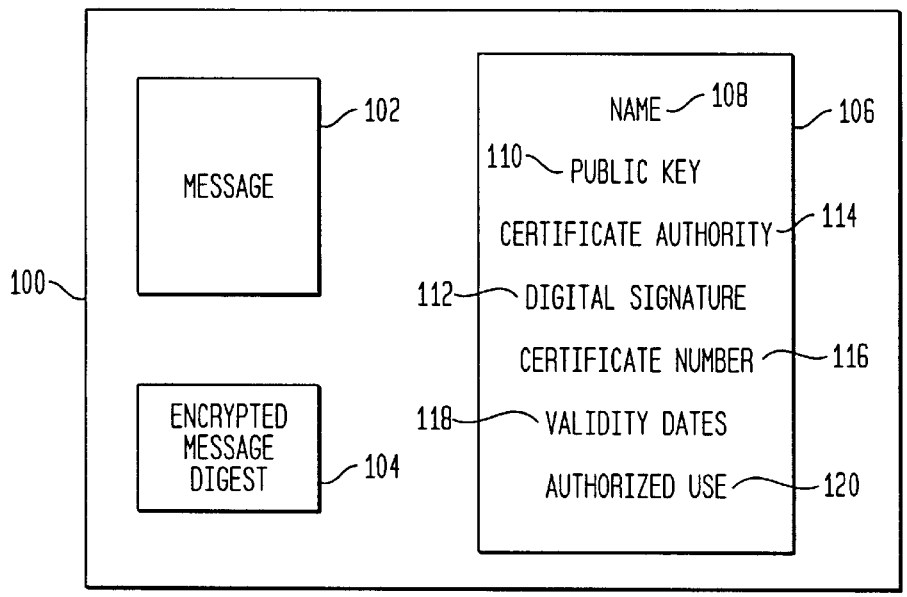
FIG. 1 is a schematic representation of a Signed Message and Public Key Certificate (SMPKC)
FIG. 3 is a security level and indemnification rate table.

Referring to FIG. 1, a signed message with a public key certificate attached thereto (hereinafter referred to as a "SMPKC") is shown at 100. The SMPKC 100 includes a message 102, an encrypted digest of the message 104 (also known as a digital signature), and a public key certificate 106. Message 102 is the actual message being sent by a sender. The encrypted digest 104 is created, for example, by applying a one-way hash function to the message 102 to create a digest of the message and then encrypting the message digest utilizing the sender's private key and an encryption algorithm such as RSA (the encrypted message digest also referred to as a "digital signature"). The public key certificate 106 includes an identification of the certificate holder (sender) 108, the certificate holder's public key 110 which has been digitally signed with the private key of a certificate authority (certificate authority signature 112) who is usually a trusted third party. Furthermore, the public key certificate 106 may also include the name of the certificate authority 114, a unique certificate number 116, the validity dates of the certificate 118 and any specified authorized use of the certificate 120. Alternatively, the public key certificate 106 may be delivered separately from the message 102 and encrypted digest 104 to a recipient. This is particularly useful in systems where communications bandwidth is small. In this case the public key certificate 106 need only be delivered once to each recipient.

In operation, when a sender generates a SMPKC 100, the recipient verifies the authenticity of the public key certificate 106 using the certificate authority's public key, and subsequently verifies that message 102 has not been modified using the sender's public key 110 obtained from the public key certificate 106. That is, the recipient generates a digest of the message 102, decrypts the received encrypted digest 104 using the sender's public key 110, and compares the generated message digest to the decrypted received message digest. If the digests fail to match, the recipient knows that the message has been altered and cannot be relied on.

The above description of the SMPKC is known in the art such that a further detailed description is not considered warranted for an understanding of the instant invention. Moreover, while the SMPKC is an electronic data file in the preferred embodiment, it could also be contained in a printed document or on any other tangible medium such as a smart card or a computer diskette.

Figure 2:
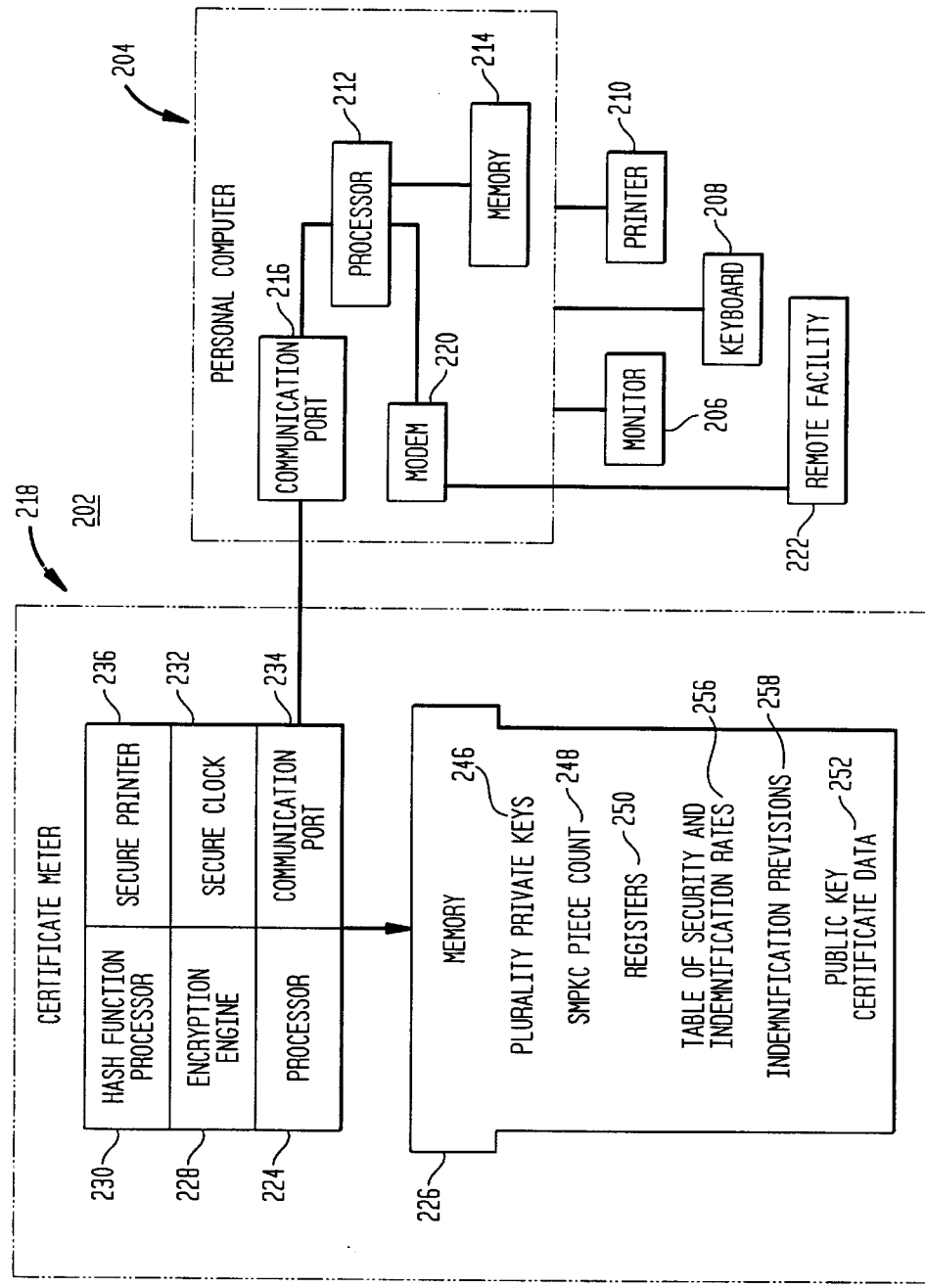
FIG. 2 is a schematic diagram of the inventive certificate metering system.

Referring to FIG. 2, a certificate metering system, shown generally at 202, includes a personal computer 204 connected to a monitor 206, a keyboard 208, and a printer 210. The personal computer 204 additionally includes a processing subsystem 212 having an associated memory 214. The processing subsystem 212 is connected to a communications port 216 for communication with a secure certificate meter subsystem 218 and a modem 220 for communicating with a remote facility 222. It should be recognized that many variations in the organization and structure of the personal computer 204 as well as the certificate metering subsystem 218 can be implemented. As an example, the communications from the modem 220 to the remote facility can be by way of hardwire, radio frequency, or other communications including the Internet. The certificate metering subsystem 218 may take many forms such as, for example, a secure vault type system, or a secure smart card system.

The certificate meter subsystem 218 includes a processor 224 coupled to a memory 226. The processor 224 has associated with it an encryption engine 228, a hash function processor 230, a secure clock 232 and a communications port 234. If desired, either a secure printer or a non-secure printer may be connected to the certificate meter subsystem 218 if a printing capability is desired. In FIG. 2, a secure printer is shown at 236. The memory 226 may have stored within it different data as well as the operating program for the certificate meter subsystem 218. The data shown as stored in memory 226 includes a plurality of private keys 246 which have varying lengths (i.e. 512, 1024, to 4096 bits), an issued SMPKC piece count 248, and SMPKC ascending/descending registers 250 which account for the fees associated with the issuance of individual SMPKC'S as discussed in more detail below. The ascending/descending registers 250 can be conventional accounting circuitry such as that used in postage metering systems which has the added benefit of being capable of being recharged with additional prepaid funds via communication with a remote data center. Additionally, some data stored in memory 226 can be encrypted and stored externally to certificate meter subsystem 218.

Additionally, memory 226 further includes 1) for each of the plurality of private keys 246 corresponding public key certificate data 252 and 2) a table of security and indemnification rates 256 which is shown in detail in FIG. 3. Table 256 includes a key column 258 which includes pointers "A", "B", and "C" that each correspond to a specific one of the plurality of keys 246. A second column 260 shows the length of each key and a third column 262 indicates the level of protection in years provided by each key. A fourth column 264 provides different levels of indemnification that the certificate authority is willing to provide for a message digitally signed using a specific private key while a fifth column 266 associates a service charge for the particular private key/level of security/indemnification levels chosen. Finally, a sixth column 268 shows the processing time associated with the use of each private key during the generation of the SMPKC. While table 256 is shown as having the above six columns for the purpose of completely showing the relationship between each of the column elements, only three columns are really needed. That is, only the rate, indemnification, and security levels are needed since the security level is indicative of the private key to be used. Furthermore, table 256 can incorporate the concepts of U.S. Pat. No. 5,448,641 which provides a mechanism for verifying the integrity of rate tables downloaded from a remote data center. Thus, updates to the table 256 can be provided from the remote facility 222 in such a manner that improper attempts to modify the rate table are detectable.

Figure 4:
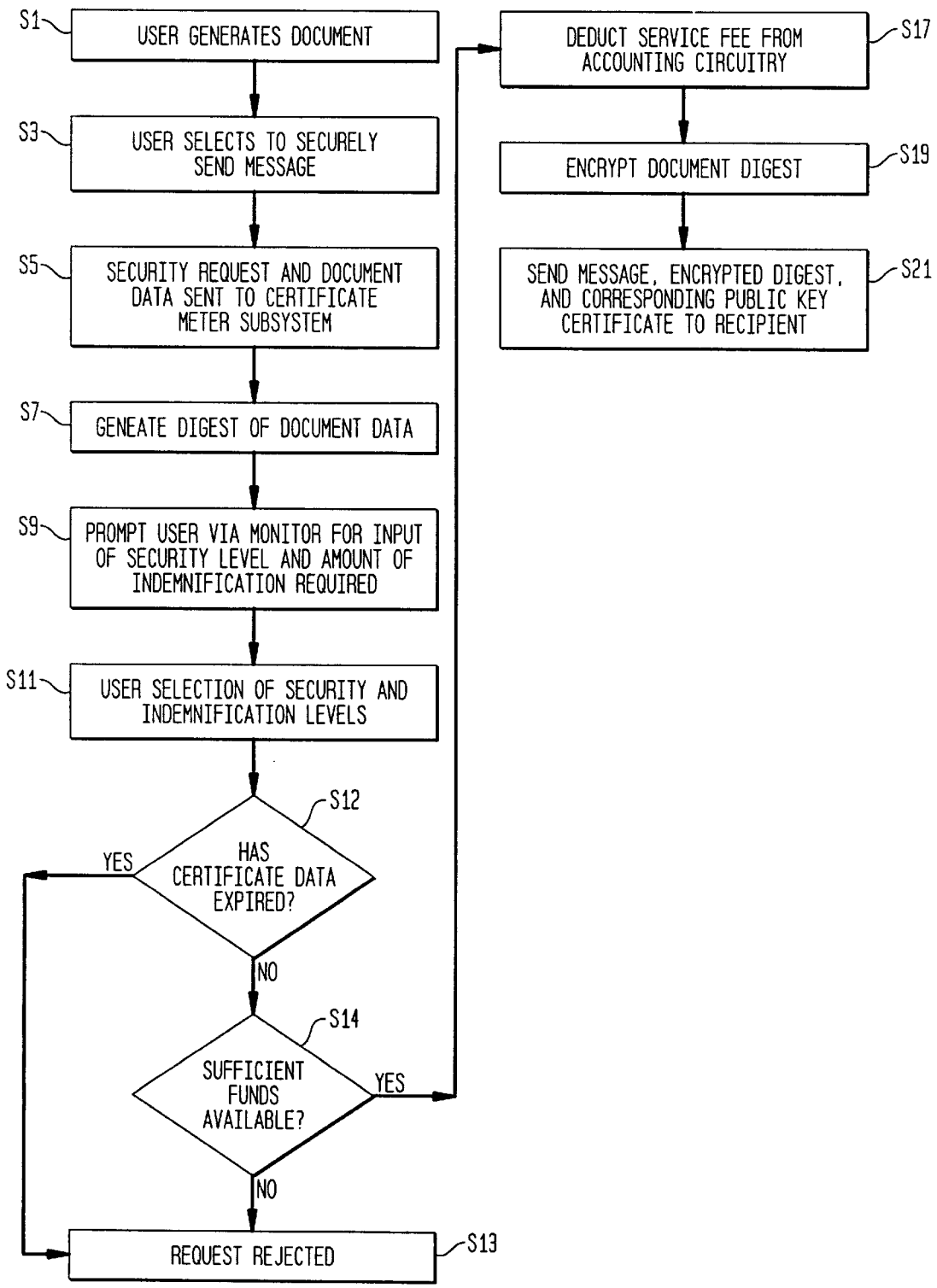
FIG. 4 is a flow chart of the operation of the certificate metering system.

Referring to FIG. 4, the operation of the certificate metering system 202 will be explained. At step S1, a user generates a message (document) utilizing an application program stored in memory 214. Upon completion of the document the user can elect to securely send the message to a recipient via the modem 220 by clicking on an icon appearing on monitor 206 or alternatively pressing a special function key of keyboard 208 (step S3). In either case, once the security option has been elected the personal computer 204 sends such request together with the document data to the certificate meter subsystem 218 via the communication ports 216 and 234 (step S5). At step S7, the hash function processor 230 generates a message digest of the document data and the user prompted via the monitor 206 as to the level of security and amount of indemnification desired (step S9). In the preferred embodiment at step S9 a rate table having at least columns 262, 264, and 266 will be displayed. Once the user has made their selection (step S11), the certificate meter subsystem 218 checks the corresponding certificate data 252 to determine if it has expired (beyond validity date) (step S12). If the answer at step S12 is "YES", the request is rejected and the user notified of such rejection via the monitor 206 at step S13. If the answer at step S12 is "NO", the certificate meter subsystem 218 determines if sufficient funds are available in the accounting circuitry 250 to pay for the requested transaction (step S14). If the answer at step S14 is "NO" the request is rejected and the user is notified of such rejection via the monitor 205 (step S15). On the other hand, if the answer at step S14 is "YES" the amount of the service charge associated with signing the document is deducted within the accounting circuitry 250 (step S17). At step S19 the message digest is then encrypted utilizing the specific one of the plurality of keys 246 associated with the selected security level/indemnification level and the encryption engine 228 (which contains the encryption algorithm). The encrypted message digest is sent via the computer 204 and modem 220 to a recipient together with its corresponding public key certificate 106 and the document data (step S21).

Regarding the rate table 256, it can be updated from a remote data center during a funds refill process for the ascending/descending registers 250. This provides the certificate authority with the ability change the fee structure over time without requiring the return of the certificate metering system 202. Furthermore, the selected amount of indemnification, the time period for which the indemnification is valid, and other specific terms and conditions of the indemnification being provided can be included as part of the public key certificate and as part of the document data which is digitally signed. Thus, the recipient will obtain such indemnification information in a form that can be used to authenticate the sender and verify that the indemnification information has not been altered. The indemnification provisions 258 can be securely stored within the certificate meter subsystem 218 in the same manner as the rate table 256 so that it can be securely updated from the remote data center 222. Additionally, a plurality of different indemnification provisions can be stored within the certificate meter subsystem 218 with each indemnification provision being tied to a corresponding one of a plurality of specific rate tables 256 stored in memory 226. In this embodiment, the service charge for the indemnification is not only governed by the amount of the indemnification and the indemnification time period but by other indemnification provisions. Such other indemnification provisions could include limitations on the certificate authority's liability based on the failure of the recipient or sender to adequately protect their certificate meters or limitations on the types of damages covered by the indemnification (i.e. no indirect or consequential damages).

In yet another embodiment, table 256 can exclude the indemnification column such that only the security level and service rate columns 262/266 are needed. In this configuration no indemnification is provided by the certificate authority and the service charge is based solely on the security provided by the selected one of the plurality of keys 246 (security level).

In still another embodiment, the certificate metering system 202 may only include a single private key 246 but allows the user to select different indemnification provision packages which each contain different indemnification provisions. In this embodiment the rate table 256 includes the service charge associated with each indemnification provision package. In this embodiment, the user is shown the indemnification options via the monitor 206 and selects the desired option via keyboard 208.

Finally, the certificate meter subsystem 218 can be programmed to store SMPKC usage information in memory 226. The usage information is used to automatically determine discounts based on predetermined usage thresholds. Thus, when a discount is warranted based on the counted number of SMPKC generated, the accounting circuitry can account for such discounted service charge.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims.

What is claimed is:

1. A system comprising:

an accounting register;

means for creating and attaching a digital signature to a message;

a memory having stored therein a plurality of different indemnification provisions and a plurality of different service rates each associated with a corresponding one of the plurality of different indemnification provisions;

means for selecting and associating a specific one of the plurality of different indemnification provisions to the digital signature; and means for adjusting the accounting register, wherein at times when the specific one of the plurality of different indemnification provisions has been selected and associated with the digital signature the adjusting means accounts for a one of the plurality of different service rates that corresponds to the specific one of the plurality of different indemnification provisions.

2. A system as recited in claim 1, further comprising means for sending the message, the digital signature, and the specific one of the plurality of different indemnification provisions to a recipient.

3. A system as recited in claim 2, wherein the digital signature is generated based upon the message and the specific one of the plurality of different indemnification provisions.

4. A system as recited in claim 3, further comprising means for discounting the plurality of different indemnification service rates based upon a predetermined number of digital signatures generated.

5. A system as recited in claim 1, wherein the plurality of different indemnification provisions are at least one of a plurality of indemnification amounts, and a plurality of indemnification time periods.

6. A system as recited in claim 1, wherein the plurality of different indemnification provisions are a plurality of different indemnification packages, and each of the indemnification packages includes a plurality of terms and conditions which in combination are different from the terms and conditions of any other one of the plurality of different indemnification packages.

7. A system as recited in claim 2, wherein the memory has stored therein a public key certificate that corresponds to the digital signature and the sending means sends the message, the digital signature, the public key certificate, and the specific one of the plurality of different indemnification provisions to the recipient.

8. A system as recited in claim 7, further comprising means for preventing the generating of the digital signature at times when the public key certificate has expired.

9. A system as recited in claim 1, further comprising means for preventing the generating of the digital signature at times when funds stored in the accounting register are below the one of the plurality of different service rates that corresponds to the specific one of the plurality of different indemnification provisions.

10. A system comprising:

means for generating a message;

means for selecting one of a plurality of different private keys and one of a plurality of different indemnification provisions stored within the system, each of the plurality of different private keys providing a different level of security when used in the generation of an SMPKC for the message and each of the plurality of different indemnification provisions providing a different type of indemnification;

means for associating each of a plurality of different service charges with a corresponding one of the plurality of different private keys and a corresponding one of the plurality of different indemnification provisions;

means for generating an SMPKC for the message using the selected one of the plurality of different private keys; and means for accounting for a one of the plurality of different service charges that corresponds to the selected one of the plurality of different private keys and the selected one of the plurality of different indemnification provisions.

11. A system as recited in claim 10, further comprising means for sending the SMPKC and the selected one of the plurality of different indemnification provisions to a recipient.

12. A system as recited in claim 11, wherein the selected one of the plurality of different indemnification provisions is included as part of the SMPKC.

13. A system as recited in claim 12, further comprising means for discounting the plurality of different service charges based upon a predetermined number of SMPKCS generated by the system.

14. A system as recited in claim 10, wherein the plurality of different indemnification provisions are at least one of a plurality of indemnification amounts and a plurality of indemnification time periods.

15. A system as recited in claim 10, wherein the plurality of different indemnification provisions are a plurality of different indemnification packages, and each of the indemnification packages includes a plurality of terms and conditions which in combination are different from the terms and conditions of any other one of the plurality of different indemnification packages.

16. A method for sending a message comprising the steps of:

creating and attaching a digital signature to the message;

storing in a memory a plurality of different indemnification provisions and a plurality of different service rates each associated with a corresponding one of the plurality of different indemnification provisions;

selecting and associating a specific one of the plurality of different indemnification provisions to the digital signature; and adjusting, at times when the specific one of the plurality of different indemnification provisions has been selected and associated with the digital signature, an accounting device to account for a one of the plurality of different service rates that corresponds to the specific one of the plurality of different indemnification provisions.

* * * * *